(12) United States Patent
Parkinson

(10) Patent No.: US 9,695,875 B2
(45) Date of Patent: Jul. 4, 2017

(54) TOP DRIVE BEARING FOR USE IN A TOP DRIVE SYSTEM, AND MADE OF NON-VACUUM ARC REMELTED STEEL CONFIGURED TO ACHIEVE AN EXTENDED LIFE CYCLE AT LEAST EQUIVALENT TO A LIFE FACTOR OF THREE FOR A VACUUM ARC REMELTED STEEL

(71) Applicant: Roller Bearing Company of America, Inc., Oxford, CT (US)

(72) Inventor: Steven Parkinson, Florence, SC (US)

(73) Assignee: Roller Bearing Company of America, Inc., Oxford, CT (US)

(*) Notice: Subject to any disclaimer, the term of this patent is extended or adjusted under 35 U.S.C. 154(b) by 420 days.

(21) Appl. No.: 14/327,912

(22) Filed: Jul. 10, 2014

(65) Prior Publication Data

US 2015/0023626 A1    Jan. 22, 2015

Related U.S. Application Data

(60) Provisional application No. 61/847,123, filed on Jul. 17, 2013.

(51) Int. Cl.
  *F16C 33/62* (2006.01)
  *F16C 33/36* (2006.01)
  *F16C 19/30* (2006.01)

(52) U.S. Cl.
  CPC .............. *F16C 33/62* (2013.01); *F16C 19/30* (2013.01); *F16C 33/366* (2013.01); *F16C 2220/62* (2013.01)

(58) Field of Classification Search
  CPC .................................. C22C 38/44; F16C 33/62
  See application file for complete search history.

(56) References Cited

U.S. PATENT DOCUMENTS

| 4,043,798 A * | 8/1977 | Nashiwa ............... C21C 7/0037 102/517 |
| RE34,278 E | 6/1993 | Beswick |
| 5,660,647 A | 8/1997 | Mitamura et al. |

(Continued)

FOREIGN PATENT DOCUMENTS

| EP | 2450524 A1 | 9/2012 |
| JP | 3982368 B2 | 9/2007 |

(Continued)

*Primary Examiner* — Jessee Roe
*Assistant Examiner* — Christopher Kessler
(74) *Attorney, Agent, or Firm* — Murtha Cullina LLP

(57) ABSTRACT

A top drive thrust bearing configured for use in a heavy loaded top drive system. The top drive thrust bearing includes an upper plate; a lower plate; and a plurality of rollers disposed between the upper plate and the lower plate. The composition of the top drive thrust bearing comprising a non-vacuum arc remelted steel including, in weight percent (%), about 0.15% to about 0.18% carbon (C), about 0.15% to about 0.4% silicon (Si), about 0.4% to about 0.7% manganese (Mn), 0% to about 0.025% phosphorus (P), about 0.0005% to about 0.002% sulfur (S), about 0.0002% to about 0.0007% oxygen (O), about 0.001% to about 0.003% titanium (Ti), about 1.3% to about 1.6% chromium (Cr), about 3.25% to about 3.75% nickel (Ni), about 0.0005% to about 0.003% calcium (Ca), about 0.15% to about 0.25% molybdenum (Mo), balance iron (Fe).

9 Claims, 1 Drawing Sheet

(56) References Cited

U.S. PATENT DOCUMENTS

| | | |
|---|---|---|
| 5,843,369 A | 12/1998 | Obara et al. |
| 6,491,768 B1 | 12/2002 | Furuta et al. |
| 7,435,308 B2 | 10/2008 | Tanaka et al. |
| 7,785,427 B2 | 8/2010 | Maziasz et al. |
| 7,785,531 B2 | 8/2010 | Rabitsch et al. |
| 7,803,237 B2 | 9/2010 | Cokain et al. |
| 8,485,730 B2 | 7/2013 | Morishita et al. |
| 8,535,457 B2 | 9/2013 | Maeda |
| 8,562,713 B2 | 10/2013 | Guliana et al. |
| 8,590,610 B1 | 11/2013 | Keast |
| 2002/0124911 A1* | 9/2002 | Hetzner .................. C22C 38/22 148/233 |
| 2009/0008154 A1 | 1/2009 | El Hakam et al. |
| 2010/0021097 A1 | 1/2010 | Uchida et al. |
| 2011/0168451 A1 | 7/2011 | DiGiovanni et al. |
| 2012/0063944 A1 | 3/2012 | Lund et al. |
| 2012/0134615 A1 | 5/2012 | Takasugi et al. |
| 2012/0160363 A1 | 6/2012 | Jin et al. |

FOREIGN PATENT DOCUMENTS

| | | |
|---|---|---|
| JP | 4176471 B2 | 11/2008 |
| JP | 2011190921 A | 9/2011 |
| JP | 2013221179 A | 10/2013 |
| WO | 03062657 A1 | 7/2003 |
| WO | 2013058131 A1 | 4/2013 |
| WO | 2013087379 A1 | 6/2013 |

\* cited by examiner

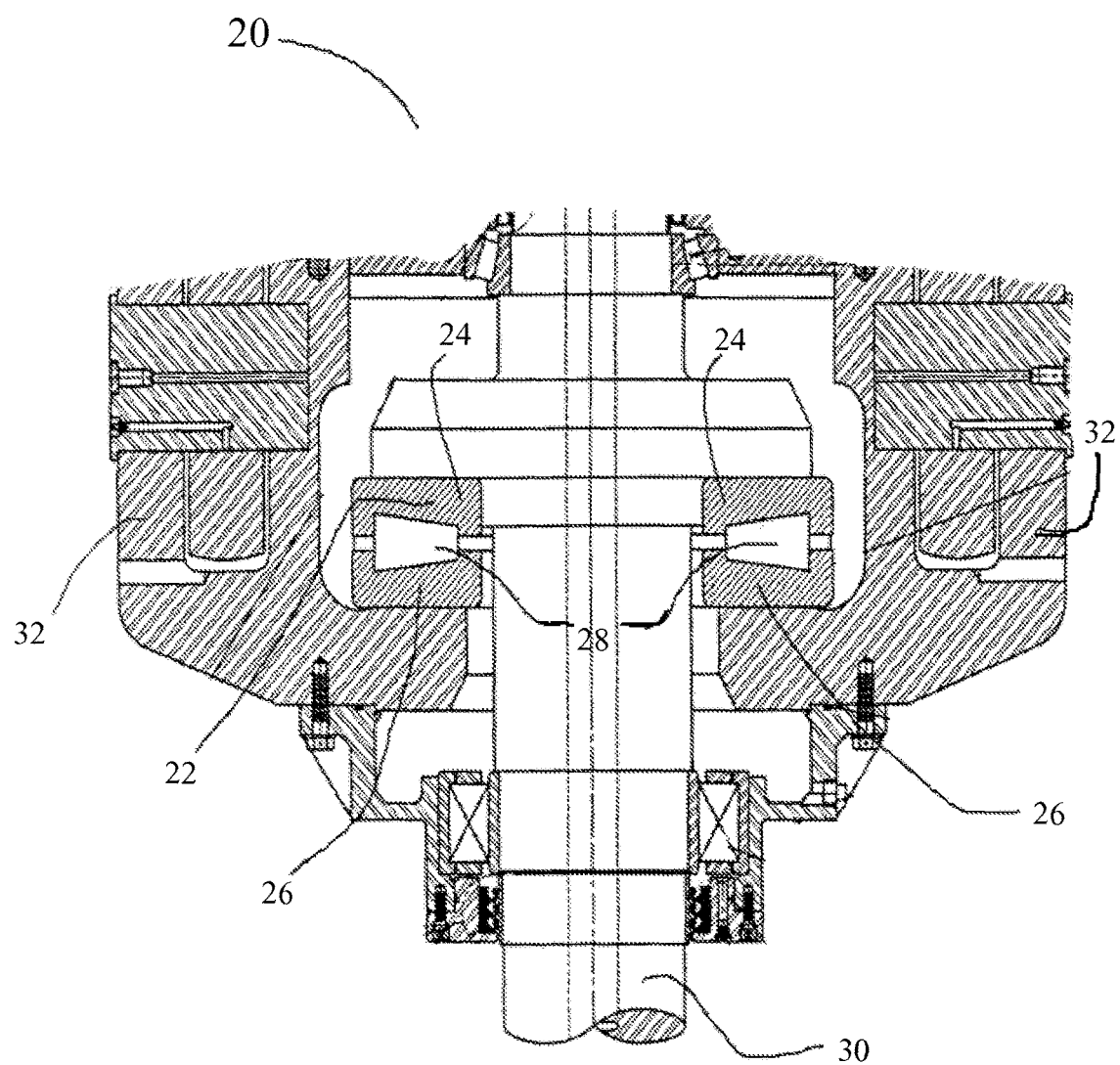

TOP DRIVE BEARING FOR USE IN A TOP DRIVE SYSTEM, AND MADE OF NON-VACUUM ARC REMELTED STEEL CONFIGURED TO ACHIEVE AN EXTENDED LIFE CYCLE AT LEAST EQUIVALENT TO A LIFE FACTOR OF THREE FOR A VACUUM ARC REMELTED STEEL

CROSS-REFERENCE TO RELATED APPLICATION

This application claims priority to U.S. Provisional Patent Application No. 61/847,123, filed Jul. 17, 2013, the subject matter of which is incorporated herein by reference in its entirety.

TECHNICAL FIELD

The present disclosure is generally directed to non-vacuum arc remelted roller bearings and is more specifically directed to non-vacuum arc remelted, heavy loaded, large tapered roller thrust bearings for use in oil drill top drives of top drive systems, which require long life bearing capabilities and which achieve an extended life factor at least equivalent to a life factor of three for a vacuum arc remelted steel.

BACKGROUND INFORMATION

Roller bearings used in industries, such as the oil and gas industry, are exposed to extremely harsh operating conditions during use in on and off shore oil rigs, which place great stress and load on the bearings. For example, off shore oil rigs are driven to be used in increasingly deeper water and it is not unusual for the components thereof, such as tubes, rods and so forth, to extend to a depth of between about 1000 to 1500 feet to reach the sea bed. During operation of the oil rig, these various descended components must also rotate to obtain the proper drilling action. Accordingly, such factors translate to a great load on the top drive bearing located within a top drive system of the oil rig.

The top drive system of an oil rig, in general, typically comprises a flat platform and an arrangement thereon including a top drive bearing for turning the afore-referenced rods, tubes and so forth to cause the desired drilling action. As one can appreciate, the deeper the drilling, the more load is required on the top drive bearing for the rotating and drilling action.

The basic static load rating for a thrust bearing is proportional to the number of rollers (Z) times the roller length (L) times the roller diameter (D). The dynamic load rating for a thrust bearing is proportional to $L^{7/9}Z^{3/4}D^{29/27}$. Therefore, as the length of the rollers, the number of the rollers, and the roller diameters are increased, the static and dynamic load carrying capability of the bearing increases accordingly. This bearing steel is carburized for use in top drives, a process which imparts additional desired properties to the material.

The life of a thrust roller bearing is proportional to $b(C/P)^{10/3}$ where P is the applied load, C is the dynamic capacity, and b is a so-called life factor.

A standard, modern day, bearing material is a through hardened vacuum degassed AISI 52100 steel. The well known life factor for this material is b=1.5. Vacuum remelting of the AISI 52100 material reduces the number and size of material inclusions. This processing is known to double the life factor of the same bearing. The life factor thus becoming 3.0.

However, vacuum remelting is an expensive process and adds significantly to the cost of the material.

Accordingly, scientists and engineers working under the direction of Applicants' Assignee are seeking to develop a top drive bearing for use in a top drive system that yields a life factor of at least three (3.0) without the additional cost of vacuum remelting processing.

Embodiments of the present invention address the above need, as well as others.

SUMMARY

According to an aspect of the present invention, disclosed is a top drive thrust bearing configured for use in a heavy loaded top drive system. The top drive thrust bearing comprises an upper plate; a lower plate; and a plurality of rollers disposed between the upper plate and the lower plate. The composition of the top drive thrust bearing comprises a non-vacuum arc remelted steel comprising, in weight percent (%), about 0.15% to about 0.18% carbon (C), about 0.15% to about 0.4% silicon (Si), about 0.4% to about 0.7% manganese (Mn), 0% to about 0.025% phosphorus (P), about 0.0005% to about 0.002% sulfur (S), about 0.0002% to about 0.0007% oxygen (O), about 0.0005% to about 0.003% titanium (Ti), about 1.3% to about 1.6% chromium (Cr), about 3.25% to about 3.75% nickel (Ni), about 0.0005% to about 0.003% calcium (Ca), about 0.15% to about 0.25% molybdenum (Mo), balance iron (Fe). The top drive thrust bearing of the top drive system is configured to achieve an extended life cycle at least equivalent to a life factor of three for a vacuum arc remelted steel.

According to another aspect of the present invention, disclosed is a top drive system comprising a stationary frame; a rotatable shaft within the frame; and a top drive thrust bearing surrounding the shaft. The top drive thrust bearing of the top drive system comprises an upper plate; a lower plate, wherein at least one of the upper plate and the lower plate is secured to the frame; and a plurality of rollers disposed between the upper plate and the lower plate. The composition of the top drive thrust bearing comprises a non-vacuum arc remelted steel comprising, in weight percent (%), about 0.15% to about 0.18% carbon (C), about 0.15% to about 0.4% silicon (Si), about 0.4% to about 0.7% manganese (Mn), 0 to about 0.025% phosphorus (P), about 0.0005% to about 0.002% sulfur (S), about 0.0002% to about 0.0007% oxygen (O), about 0.0005% to about 0.003% titanium (Ti), about 1.3% to about 1.6% chromium (Cr), about 3.25% to about 3.75% nickel (Ni), about 0.0005% to about 0.003% calcium (Ca), about 0.15% to about 0.25% molybdenum (Mo), balance iron (Fe). The top drive thrust bearing of the top drive system is configured to achieve an extended life cycle at least equivalent to a life factor of three for a vacuum arc remelted steel.

DESCRIPTION OF THE DRAWINGS

The FIGURE is a schematic illustration of a cross-section of a portion of a top drive system including a top drive bearing located therein, according to embodiments.

DETAILED DESCRIPTION

A material (i.e., compositional) solution is proposed to address the afore-referenced need of how to increase the capacity of top drive bearings for heavy loaded top drive assembly applications thus overcoming problems associated with, e.g., increasing the size of the bearings and/or altering the internal configuration/adding more rollers to the bearings. Specifically, a material solution has been determined for heavy loaded top drive bearing applications that provides longer life to the heavy loaded top drive bearing, e.g., top drive thrust roller bearing, using the same load. For instance, increased load on a bearing can translate to a shorter life of the bearing. A main cause of failure of heavy loaded bearings is material failure. Thus, if one can use a material composition for the top drive bearing of a top drive system to provide longer life, more load may be placed on the bearing and the desired life span including the desired predetermined set of operating criteria can be achieved. Thus, a higher rating for the top drive bearing of the top drive system can be advantageously achieved, according to embodiments. This higher load rating and life can be achieved at a lower cost.

Moreover, the herein proposed solution for the heavy loaded top drive bearings of the top drive systems can advantageously save on engineering time and reconstruction costs as the necessary, longer life of the top drive bearing can be achieved without increasing the bearing size.

A further advantage of the solution described herein for the heavy loaded top drive bearings for use in the top drive systems, according to embodiments, is that these bearings are non-vacuum arc remelted steel bearings, but configured to achieve a life factor of at least three, the same as vacuum arc remelted steel. This is significant and surprising because typically vacuum arc remelted steel processing is employed in an attempt to achieve the desired "cleanliness" of steel for longer life bearings. However, the vacuum arc remelting process is a complex, multi-step processing route that consumes a great deal of power and thus is more expensive than conventional, single processing of steel such as with the use of an electric arc furnace.

Thus, the inventor has advantageously determined, according to embodiments, how to achieve a top drive bearing for use in a top drive system, with the superior properties of a multi-step vacuum arc remelted steel, but without the use of the costly and complex multi-step processing of vacuum arc remelting. Thus, according to embodiments, disclosed a "first time through", e.g., single processed, heavy loaded steel top drive bearing of the desired cleanliness (structural capability) using steel that has approximately the properties of the much more expensive, complex multi-step processing vacuum arc remelting.

A further advantage of the solution described herein for heavy loaded top drive bearing applications and as further described below, according to embodiments, is that the top drive bearings for use in top drive systems obtain uniform properties in the process direction, as well as perpendicular thereto. According to the inventor, it is believed that only conventional grades of material have been used (e.g., Timken's parapremium grade steel) in such applications and do not have uniform properties in the process direction and perpendicular thereto.

Referring now to the FIGURE, disclosed therein according to an exemplary and non-limiting embodiment, is a top thrust drive bearing 22 configured for use in a heavy loaded top drive system 20. In brief, the top drive system 20 shown in the FIGURE comprises a rotating portion or shaft 30 for the afore-described drilling action, and a stationary portion or outer frame 32. The top drive thrust bearing 22 surrounds the shaft 30 and is thus subjected to great stress or load during drilling operation The top drive thrust bearing 22 shown in the FIGURE comprises an upper plate 24; a lower plate 26; and a plurality of rollers 28 disposed between the upper plate 24 and the lower plate 26. The bearing 22 of the FIGURE is generally a tapered roller assembly having a plurality of large tapered rollers 28 (e.g., rolling elements) disposed between the upper plate 24 and the lower plate 26. The tapered rollers are generally manufactured from a metallic material. Each of the tapered rollers 28 define an exterior surface that is in rolling engagement with the inner surface of the upper plate 24 and the inner surface of the lower plate 26. While the bearing 22 is shown as being generally annular and having a plurality of large tapered rollers 28 (rolling elements), the present invention is not limited in this regard as other types of roller elements, including but not limited to ball bearings, needle bearings, and so forth may be employed.

Referring now to the material composition of the top drive thrust bearing 22 of the FIGURE, especially the upper plate 24 and lower plate 26, according to embodiments, the composition comprises a non-vacuum arc remelted steel comprising, in weight percent (%), about 0.15% to about 0.18% carbon (C), about 0.15% to about 0.4% silicon (Si), about 0.4% to about 0.7% manganese (Mn), 0% to about 0.025% phosphorus (P), about 0.0005% to about 0.002% sulfur (S), about 0.0002% to about 0.0007% oxygen (O), about 0.0005% to about 0.003% titanium (Ti), about 1.3% to about 1.6% chromium (Cr), about 3.25% to about 3.75% nickel (Ni), about 0.0005% to about 0.003% calcium (Ca), about 0.15% to about 0.25% molybdenum (Mo), balance iron (Fe). It is noted that the referenced compositions disclosed herein may also be referred to as "super clean" non-vacuum arc remelted, e.g., steel compositions having similar or approximate, or even better, properties in terms of cleanliness as a vacuum arc remelted steel, according to embodiments. All or part of the top drive bearing 22 can comprise non-vacuum arc remelted steel compositions disclosed herein, according to embodiments. For example, the rollers 28 may be made of such a composition or a different metallic material.

The top drive thrust bearing 22 for use in the top drive system 20 is configured to achieve an extended life cycle at least equivalent to a life factor of three for a vacuum arc remelted steel.

Tables 1 below provides further details regarding the elemental ranges of the composition, according to embodiments, with balance being iron (Fe). Table 2 below provides various life factors for melting practice.

TABLE 1

| Element | Approximate minimum weight percent (wt. %), which can range to the maximum weight percent set forth in next column with all values there between being suitable and within embodiments of the invention | Approximate maximum weight percent (wt. %) |
|---|---|---|
| Carbon (C) | 0.15 | 0.18 |
| Silicon (Si) | 0.15 | 0.4 |
| Manganese (Mn) | 0.4 | 0.7 |
| Phosphorus (P) | 0 | 0.025 |
| Sulfur (S) | 0.0005; 0.0075; 0.008; 0.009; 0.0010; 0.0015 | 0.002 |
| Oxygen (O) | 0.0002; 0.0003; 0.0004; 0.0005; 0.0006 | 0.0007 |
| Titanium (Ti) | 0.0005; 0.001; 0.002; 0.0025 | 0.003 |
| Chromium (Cr) | 1.3 | 1.6 |
| Nickel (Ni) | 3.25 | 3.75 |
| Calcium (Ca) | 0.0005; 0.001; 0.015; 0.002; 0.0025 | 0.003 |

TABLE 1-continued

| Element | Approximate minimum weight percent (wt. %), which can range to the maximum weight percent set forth in next column with all values there between being suitable and within embodiments of the invention | Approximate maximum weight percent (wt. %) |
|---|---|---|
| Molybdenum (Mo) | 0.15 | 0.25 |

Thus, by limiting the range of particular elements of the heavy loaded top drive bearing composition of the top drive bearing for use in a top drive system, top drive bearing properties can be improved without the need for vacuum arc remelt processing. For example, a suitable maximum allowable limit, especially regarding S, O, Ti and Ca, has been determined which in combination with other elements of the top drive bearing composition can result in less inclusions (potential sites of failure) in the steel. Thus, by particularly controlling the maximum allowable amount of S, O, Ti and Ca, in combination with the other elements and amounts thereof described herein, improvements in terms of, e.g., purity levels, cleanliness, life, and reduced undesirable inclusions can be achieved for the top drive bearings used in the top drive systems, according to embodiments. Such a result is unexpected at least in view of the extensive, possible combinations of elements and ranges for steel compositions, as well as considering that the traditional route for attempting to increase the life of bearings is to employ vacuum arc remelt processing.

TABLE 2*

| Processing | Life Factor (LF) |
|---|---|
| Air melting (AM) | 1 |
| Vacuum processing (VP) or carbon vacuum degassing (CVD) | 1.5 |
| Vacuum arc remelting (VAR)[a] | 3 |
| Electroflux remelting (EFR)[b] | 3 |
| Vacuum arc remelting-vacuum arc remelting (VAR-VAR) | 4.5 |
| Vacuum induction melting-vacuum arc remelting (VIM-VAR) | 6 |

[a]Also called consumable-electrode vacuum melting (CEVM).
[b]Also called electroslag remelting (ESR).
*Reference-STLE Life Factors for Rolling Bearings, STLE SP-34, Erwin V. Zaretsky, Editor, 1999, Park Ridge, Il.

The top drive bearings described herein, according to embodiments, are manufactured to meet ASTM A 534 (Standard Specification for Carburizing Steels for Anti-Friction Bearings) specification, especially Section 7 thereof concerning quality assurance and Section 8 concerning grain size/inclusion. In accordance with this testing, for example, and as described therein, samples may be taken from 4 by 4 inch (102 by 102 mm) rolled billets or forged billets. A minimum of six samples are examined, and macroetch specimens or forged sections representing cross sections of billets may be macroetched and rated in accordance with Method E 381 in hydrochloric acid and water (ratio of 1:1) at 160 to 180° F. (71 to 82° C.). Regarding grain size, a fine fracture grain size of ASTM No. 6 or finer may be achieved, as measured according to ASTM E 112. More specifically, according to embodiments, a carburizing grade bearing steel configured for heavy load top drive bearing applications can be achieved with isotropic properties and better fatigue strength than standard bearing quality steel, such as defined in ASTM A 534 due to higher cleanliness levels and a finer size and distribution of non-metallic inclusions. These advantageous results are believed to be the result, in part, of particular control of the content of the elements of the composition, especially with respect to the maximum allowable limit of sulfur, oxygen, titanium and calcium, as described above.

Similarly, the bearing described herein, according to embodiments, advantageously can also meet DIN 50 602 requirements. For example, sampling for micro-inclusion rating shall be size random samples from the final product dimension, with sectioning completed in accordance with DIN 50 602. Moreover, samples for micro-inclusions rating can be taken from 147 mm×147 mm billet stock prior to rolling/forging. When the oxygen content is measured at greater than 7 ppm and less than 9 ppm additional samples can be taken and rated. The DIN 50 602 Method K1 shall be used for the steel, which is a determination of index percentage area of non-metallic inclusions in a structure. That is, according to this test, the sum may be obtained by counting inclusions weighed according to the area, as measured starting from a specified size of inclusion upwards, and referring to an area of 1000 square millimeters. Thus, according to embodiments, the inclusion content can be restricted to a level identified by a K1 value of maximum 6 in finished forged rings (as DINS 50 602 Method K1 used for inclusion rating).

A further advantage of embodiments of the invention is that the top drive bearings can exhibit properties, e.g., largely equivalent to vacuum remelt steel in terms of, e.g., rolling contact fatigue resistance.

Thus, in view of the foregoing it can be seen that the inventor has surprisingly determined that modified steel chemistries and by restricting undesirable inclusions a top drive bearing, for use in a top drive system, of carburizing case hardening steel can be achieved that provides, e.g., fatigue life exceeding the fatigue life of standard grades of bearing steel (per ASTM 534), as well as meeting the properties (life) of vacuum arc remelted steel, but without the costly and complex multi-step processing required for vacuum arc remelting, according to embodiments. This is in contrast to the typical vacuum arc remelting of steel route which is a widely accepted process for attempting to obtain better bearing life.

Although the present invention has been disclosed and described with reference to certain embodiments thereof, it should be noted that other variations and modifications may be made, and the various elements and embodiments described herein can be used in any combination with each other, and it is intended that the following claims cover the variations and modifications within the true scope of the invention.

What is claimed is:

1. A top drive system comprising:
   a stationary frame;
   a rotatable shaft within the frame; and
   a top drive thrust bearing surrounding the shaft; the top drive thrust bearing of the top drive system comprising:
      an upper plate;
      a lower plate, wherein at least one of the upper plate and the lower plate is secured to the frame; and
      a plurality of rollers disposed between the upper plate and the lower plate; the composition of the top drive thrust bearing comprising a non-vacuum arc remelted steel comprising, in weight percent (%), about 0.15% to about 0.18% carbon (C), about 0.15% to about 0.4% silicon (Si), about 0.4% to about 0.7% manganese (Mn), 0 to about 0.025% phosphorus (P), about 0.0005% to about 0.002% sulfur (S), about 0.0002% to about 0.0007% oxygen (O), about 0.0005% to about 0.003% titanium (Ti), about 1.3% to about 1.6% chromium (Cr), about 3.25% to about 3.75% nickel (Ni), about 0.0005% to about 0.003% calcium (Ca), about 0.15% to about 0.25% molybdenum (Mo), balance iron (Fe).

2. A top drive thrust bearing configured for use in a heavy loaded top drive system, the top drive thrust bearing comprising:
   an upper plate;
   a lower plate; and a plurality of rollers disposed between the upper plate and the lower plate; the composition of the top drive thrust bearing comprising a non-vacuum arc remelted steel comprising, in weight percent (%), about 0.15% to about 0.18% carbon (C), about 0.15% to about 0.4% silicon (Si), about 0.4% to about 0.7% manganese (Mn), 0 to about 0.025% phosphorus (P), about 0.0005% to about 0.002% sulfur (S), about 0.0002% to about 0.0007% oxygen (O), about 0.0005% to about 0.003% titanium (Ti), about 1.3% to about 1.6% chromium (Cr), about 3.25% to about 3.75% nickel (Ni), about 0.0005% to about 0.003% calcium (Ca), about 0.15% to about 0.25% molybdenum (Mo), balance iron (Fe).

3. The top drive thrust bearing of claim 2, wherein the non-vacuum arc remelted steel comprises between about 0.001% and about 0.002% sulfur.

4. The top drive thrust bearing of claim 2, wherein the non-vacuum arc remelted steel comprises between about 0.0004% and about 0.0007% oxygen.

5. The top drive thrust bearing of claim 2, wherein the non-vacuum arc remelted steel comprises between about 0.001% and about 0.003% titanium.

6. The top drive thrust bearing of claim 2, wherein the non-vacuum arc remelted steel comprises between about 0.001% and about 0.003% calcium.

7. The top drive thrust bearing of claim 2, wherein the composition of the bearing exhibits uniform properties in a processing direction and in a direction perpendicular to the processing direction.

8. The top drive thrust bearing of claim 2, wherein the bearing is configured to achieve a fine grain size of ASTM No. 6 or finer, as measured according to ASTM E 112.

9. The top drive thrust bearing of claim 2, wherein the bearing is configured to achieve ASTM A 534 quality requirements in terms of inclusions.

* * * * *